(12) United States Patent
Kincaid et al.

(10) Patent No.: US 12,709,914 B2
(45) **Date of Patent: *Aug. 18, 2026**

(54) INTERNET OF THINGS LOCK SYSTEM

(71) Applicant: Schlage Lock Company LLC, Carmel, IN (US)

(72) Inventors: Ryan C. Kincaid, Indianapolis, IN (US); Brian C. Eickhoff, Danville, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/370,193

(22) Filed: Sep. 19, 2023

(65) Prior Publication Data

US 2024/0263485 A1 Aug. 8, 2024

Related U.S. Application Data

(63) Continuation of application No. 17/064,226, filed on Oct. 6, 2020, now Pat. No. 11,761,234, which is a (Continued)

(51) Int. Cl.
*E05B 17/00* (2006.01)
*E05B 17/10* (2006.01)
(Continued)

(52) U.S. Cl.
CPC .............. *E05B 17/10* (2013.01); *E05B 41/00* (2013.01); *E05B 47/0012* (2013.01); (Continued)

(58) Field of Classification Search
CPC ....... E05B 17/10; E05B 41/00; E05B 47/0012
See application file for complete search history.

(56) References Cited

U.S. PATENT DOCUMENTS 5,996,383 A 12/1999 Adelmeyer et al.
6,285,912 B1 9/2001 Ellison et al.
(Continued)

FOREIGN PATENT DOCUMENTS

DE 202017102190 U1 7/2018
EP 3221535 A1 9/2017
WO 2014170544 A1 10/2014

OTHER PUBLICATIONS

Examination Report; European Patent Office; European Patent Application No. 20760086.7; Nov. 24, 2023; 4 pages.
(Continued)

*Primary Examiner* — Nabil H Syed
(74) *Attorney, Agent, or Firm* — Taft Stettinius & Hollister LLP

(57) ABSTRACT

An exemplary Internet of Things (IoT) module for a lockset includes a housing assembly configured for mounting with the lockset, a controller, a wireless transceiver, and a sensor array, and may further include an LED array. The controller is in communication with an external device via the wireless transceiver, and is configured to transmit to the external device information received from the sensor array. The controller is further configured to control operation of the LED array based on information received from at least one of the sensor array or the external device.

23 Claims, 4 Drawing Sheets

Related U.S. Application Data continuation of application No. 16/278,429, filed on Feb. 18, 2019, now Pat. No. 10,794,085.

(51) Int. Cl.
*E05B 41/00* (2006.01)
*E05B 47/00* (2006.01)
*G10L 15/28* (2013.01)
*H04L 12/28* (2006.01)

(52) U.S. Cl.
CPC .......... *G10L 15/28* (2013.01); *H04L 12/2823* (2013.01); *E05B 2047/0091* (2013.01); *E05B 2047/0095* (2013.01)

(56) References Cited

U.S. PATENT DOCUMENTS

| | | | | |
|---|---|---|---|---|
| 9,982,459 | B2 | 5/2018 | Telljohann et al. | |
| 10,352,512 | B1 | 7/2019 | Smith | |
| 10,638,096 | B1 * | 4/2020 | Lin | G07C 9/00309 |
| 2003/0160681 | A1 | 8/2003 | Menard et al. | |
| 2009/0133330 | A1 | 5/2009 | Buchhalter | |
| 2010/0219957 | A1 | 9/2010 | Jolley et al. | |
| 2011/0121971 | A1 | 5/2011 | Ross | |
| 2013/0008213 | A1 | 1/2013 | Brown et al. | |
| 2015/0315816 | A1 | 11/2015 | Gopalakrishnan et al. | |
| 2016/0145895 | A1 | 5/2016 | Kankkunen | |
| 2016/0180618 | A1 * | 6/2016 | Ho | G07C 9/00563 340/5.52 |
| 2016/0343188 | A1 | 11/2016 | Johnson | |
| 2016/0348398 | A1 | 12/2016 | Telljohann et al. | |
| 2017/0198496 | A1 * | 7/2017 | Beck | E05B 17/22 |
| 2017/0236389 | A1 * | 8/2017 | Tang | E05B 1/0007 49/13 |
| 2017/0342741 | A1 * | 11/2017 | Holland | H04W 12/069 |
| 2018/0030759 | A1 | 2/2018 | Chanbonpin | |
| 2018/0073274 | A1 * | 3/2018 | Johnson | G07C 9/00309 |
| 2018/0114386 | A1 * | 4/2018 | Steinmetz | G07C 9/00571 |
| 2018/0160498 | A1 * | 6/2018 | Noeldner | H05B 45/10 |
| 2018/0187452 | A1 | 7/2018 | Hsu et al. | |
| 2019/0069377 | A1 * | 2/2019 | Wang | H05B 47/115 |
| 2020/0245423 | A1 * | 7/2020 | Honjo | F21V 23/0471 |

OTHER PUBLICATIONS

International Search Report; International Searching Authority; International Application No. PCT/US2020/018633; Aug. 12, 2020; 3 pages.

Written Opinion of the International Searching Authority; International Searching Authority; International Application No. PCT/US2020/018633; Aug. 12, 2020; 9 pages.

Nest Temperature Sensor, The right temperature, right where you want it, https://nest.com/thermostats/nest-temperature-sensor/overview/, Copyright 2019 Nest Labs, 2 pages.

Amazon.com, Toilet Light, Toilet Bowl Light, Led Motion Activated Toilet Night Light, Potty Light, 16 Colors Changing Sensor Light, https://www.amazon.com/Toilet-Motion-Activated-Colors-Changing/dp/B01MSK6NIF, Copyright 1996-2019 Amazon.com, Inc. or its affiliates, 7 pages.

Assa Abloy, Door Furniture, Brighthandle, Unsprung Lever Handles, Reference 4:3-10A, www.assa.co.uk, 1 page.

Australian Examination Report; IP Australia; Australian Application No. 2020226393; Jul. 6, 2023; 4 pages.

Canadian Examination Report; Canadian Intellectual Property Office; Canadian Application No. 3,130,774; Nov. 28, 2022; 3 pages.

Extended European Search Report; European Patent Office; European Patent Application No. 20760086.7; Oct. 14, 2022; 5 pages.

Australian Examination Report; IP Australia; Australian Patent Application No. 2020226393; Sep. 13, 2022; 3 pages.

Australian Examination Report; Australian Patent Office; Australian Patent Application No. 2024200017; Nov. 29, 2024; 3 pages.

* cited by examiner

INTERNET OF THINGS LOCK SYSTEM

CROSS REFERENCE TO RELATED APPLICATIONS

This application is a continuation of U.S. patent application Ser. No. 17/064,226 filed Oct. 6, 2020 and issued as U.S. Pat. No. 11,761,234, which is a continuation of U.S. patent application Ser. No. 16/278,429 filed Feb. 18, 2019 and issued as U.S. Pat. No. 10,794,085, the contents of each application are incorporated herein by reference in their entirety.

TECHNICAL FIELD

The present disclosure generally relates to a module that provides a lockset with capabilities useful in the Internet of Things (IoT), and more particularly but not exclusively relates to locksets including such a module.

BACKGROUND

In recent years, there has been a rise in popularity of devices configured for use with the Internet of Things (IoT) and/or smart home systems. However, certain existing devices of this type are typically provided as integrated devices that require replacement of an existing device. For example, while there may exist certain IoT-ready locksets, it is typically required that these locksets be purchased as complete units to replace a previously-installed lockset. Additionally, such IoT-ready locksets typically provide only those functions typical of electronic locksets, such as providing an indication of the locked/unlocked state of the lockset, enabling locking and unlocking the lockset, and the like. For these reasons among others, there remains a need for further improvements in this technological field.

SUMMARY

An exemplary Internet of Things module for a lockset includes a housing assembly configured for mounting with the lockset, a controller, a wireless transceiver, and a sensor array, and may further include an LED array. The controller is in communication with an external device via the wireless transceiver, and is configured to transmit to the external device information received from the sensor array. The controller is further configured to control operation of the LED array based on information received from at least one of the sensor array or the external device. Further embodiments, forms, features, and aspects of the present application shall become apparent from the description and figures provided herewith.

DETAILED DESCRIPTION OF ILLUSTRATIVE EMBODIMENTS

Figure 2:
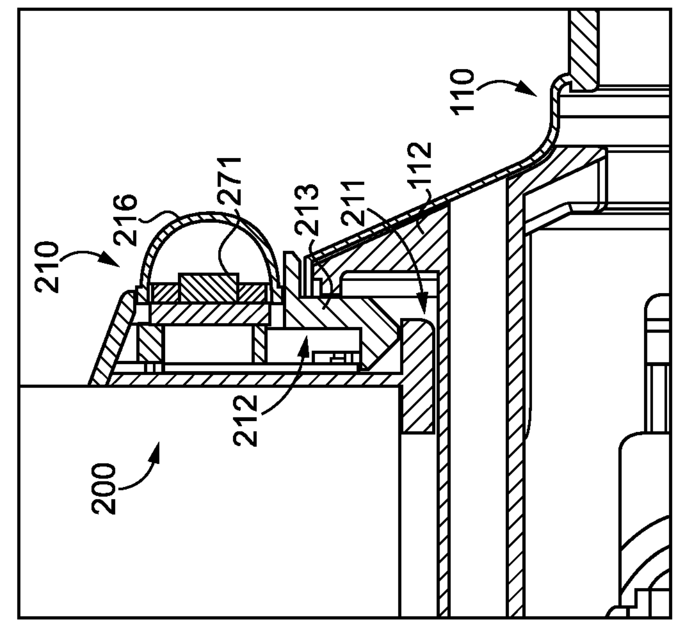
FIG. 2 is a cross-sectional view of a portion of the lockset illustrated in FIG. 1.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown certain in specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
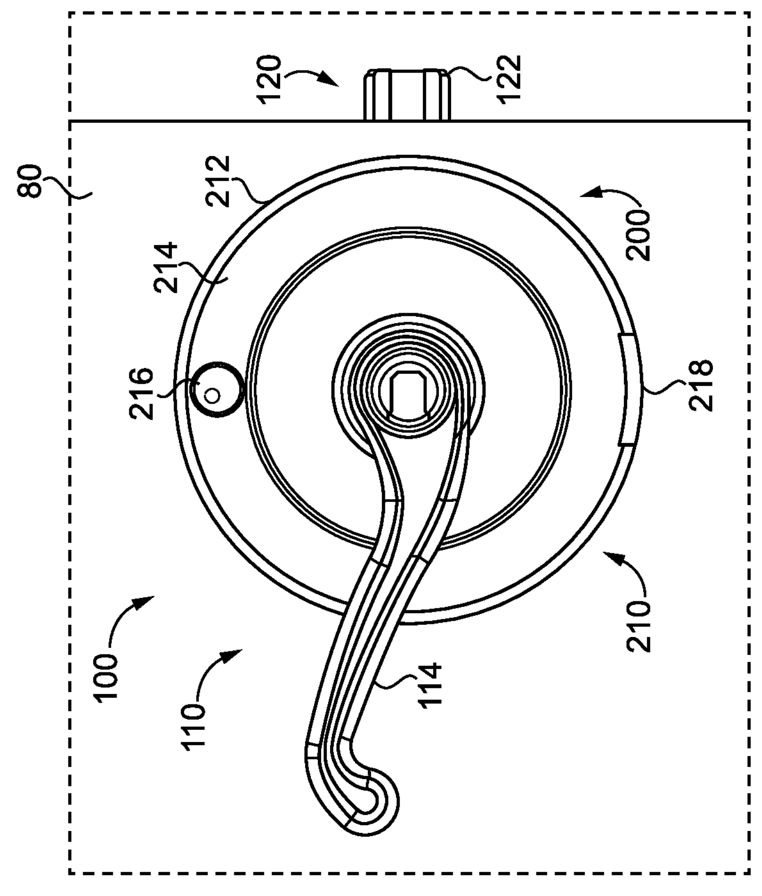
FIG. 1 is an elevational view of a lockset including an IoT module according to certain embodiments.
Figure 3:
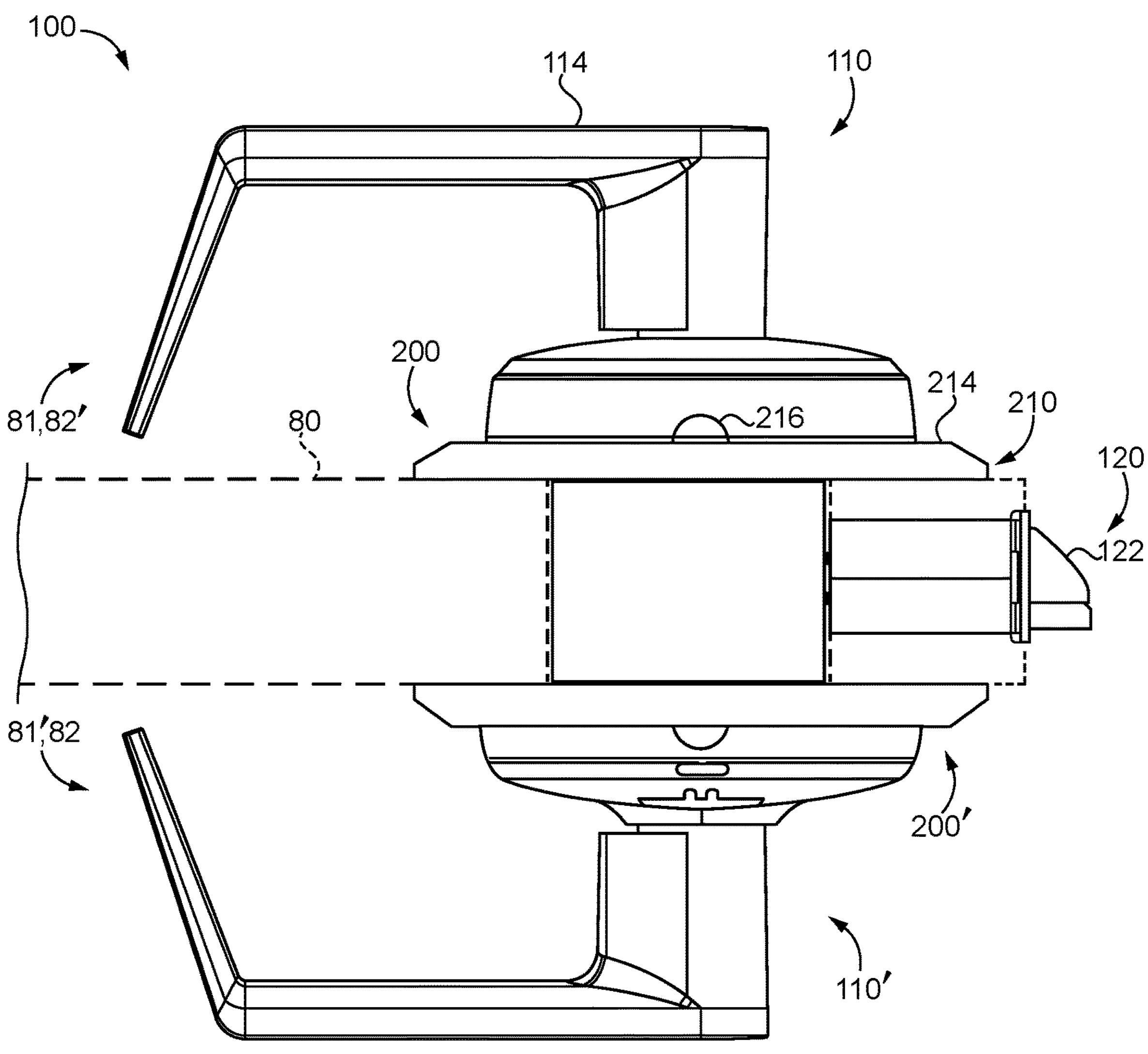
FIG. 3 is a plan view of the lockset illustrated in FIG. 1.

With reference to FIGS. 1-3, illustrated therein is a lockset 100 including an Internet of Things (IoT) module 200 according to certain embodiments. The lockset 100 is mounted to a door 80, and generally includes a first handleset 110, a second handleset 110', a latch mechanism 120 operably connected with the handlesets 110, 110', and the IoT module 200, a portion of which is captured between the first handleset 110 and the door 80. As illustrated in FIG. 3, the lockset 100 may further include a second IoT module 200', which may be captured between the second handleset 110' and the door 80.

When the door 80 is closed, the IoT module 200 is located within and faces a primary region 81, and an adjacent secondary region 82 is positioned on the opposite side of the door 80. As will be appreciated, in embodiments in which a second IoT module 200' is mounted to the opposite side of the door 80 (for example to the second handleset 110'), the second IoT module 200' is located in the adjacent secondary region 82 when the door 80 is closed. Thus, the primary region 81 of the first IoT module 200 is the secondary region 82' of the second IoT module 200', and the secondary region 82 of the first IoT module 200 is the primary region 81' of the second IoT module 200'.

The first handleset 110 generally includes a spring cage 112, a handle 114 rotatably mounted to the spring cage 112, and a decorative rose 116 that covers the spring cage 112. The handle 114 is operably connected with the latch mechanism 120 such that rotation of the handle 114 from a home position to a rotated position causes retraction of a latchbolt 122 of the latch mechanism 120. The second handleset 110' is substantially similar to the first handleset 110, and is mounted on the opposite side of the door 80 as the first handleset 110.

In the illustrated form, the handleset 110 is provided as an active handleset that is operable to retract the latchbolt 122. As such, the handle 114 is rotatably mounted to the spring cage 112 and is operably connected with the latch mechanism 120. It is also contemplated that a handleset such as the handleset 110 may be provided as a dummy handleset, in which the handle 114 is fixedly mounted to the spring cage 112. As will be appreciated, such dummy handlesets may not necessarily be operable to retract a latchbolt, and may instead be associated with a roller latch that does not require actuation, and instead provides for push/pull operation of the door. Furthermore, while the illustrated rose 116 is annular, it is also contemplated that the rose 116 may take another shape, such as that of a square or a more decorative geometry.

The IoT module 200 includes a housing assembly 210 and a plurality of electronic components supported by the housing assembly 210. The housing assembly 210 defines a central opening 211 through which a portion of the handleset 110 extends, and in the illustrated form includes an annular base 212, a translucent annular shroud 214 mounted to the base 212, an infrared-passive window 216 mounted to the shroud 214, and a battery compartment 218 movably mounted to the base 212. The base 212 includes an annular flange 213 that is captured between the spring cage 112 and the door 80 to secure the IoT module 200 in place. As described herein, the shroud 214 and the window 216 facilitate operation of one or more electronic components of the IoT module 200. The battery compartment 218 is slidably mounted to a lower end of the housing assembly 210 to facilitate insertion, removal, and replacement of a battery for the IoT module 200. In the illustrated form, the IoT module 200 is substantially annular, which may provide an enhanced aesthetic in comparison to other forms. It is also contemplated that the IoT module 200 may take another form or shape. For example, in embodiments in which the rose 116 has a non-circular outer geometry, the IoT module 200 may have a corresponding non-circular geometry that matches the non-circular outer geometry of the rose 116.

Figure 4:
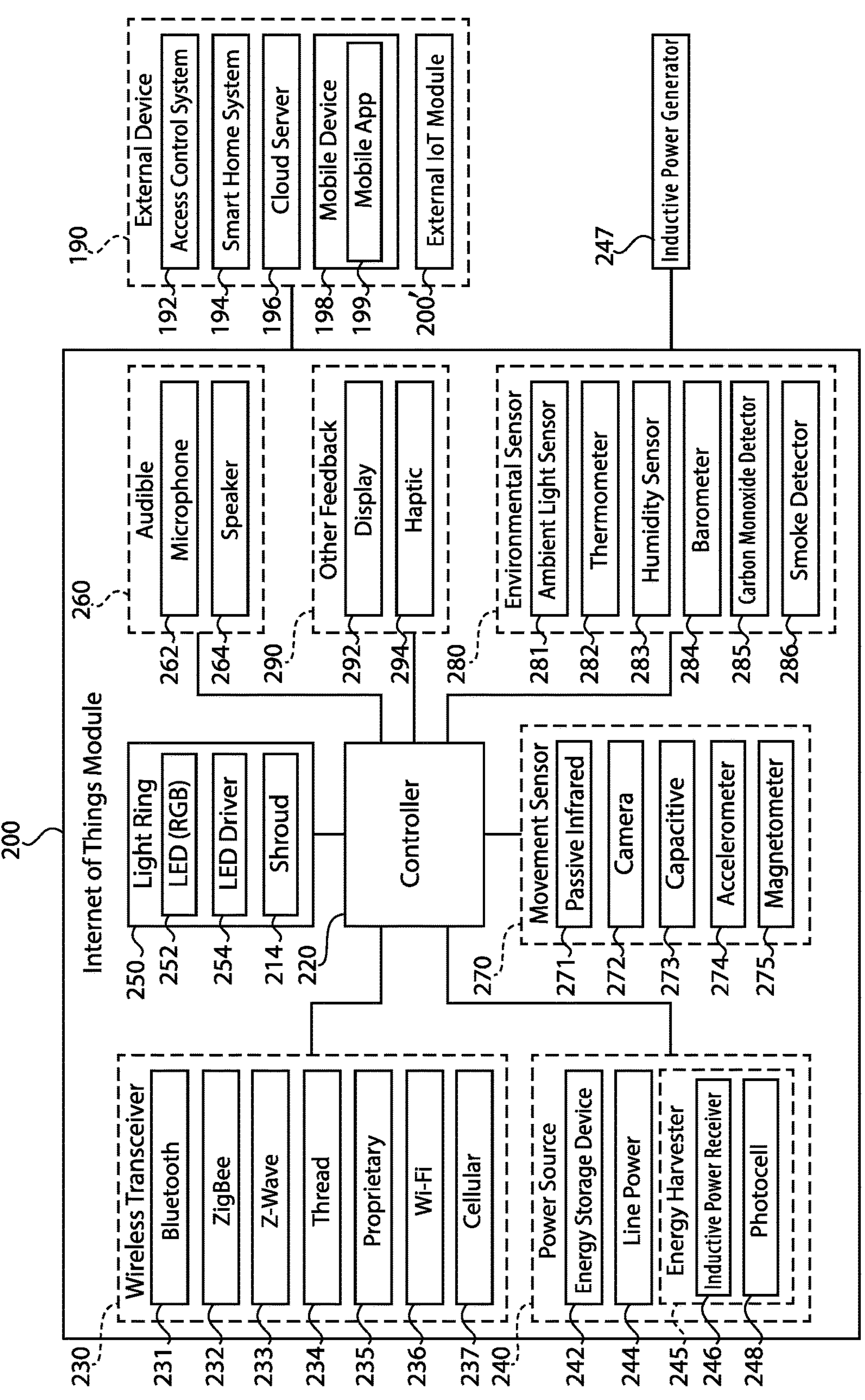
FIG. 4 is a schematic block diagram of the IoT module illustrated in FIG. 1.

With additional reference to FIG. 4, the IoT module 200 includes a plurality of electronic components, including a controller 220, a wireless transceiver 230 in communication with the controller 220, and a power source 240 operable to supply power to the controller 220 and various other electronic components, and may further comprise light ring 250 operable to illuminate the translucent shroud 214 and/or an audio device 260 operable to detect and/or generate audible sounds. The IoT module 200 further comprises a sensor array including in communication with the controller 220. The sensor array includes at least one sensor, such as at least one movement sensor 270 and/or at least one environmental sensor 280. As described herein, the controller 220 may make certain decisions based on information received from the sensor array and/or may transmit information received from the sensor array to an external device 190. In certain forms, the IoT module 200 may further include at least one additional feedback mechanism 290.

The controller 220 controls operation of the IoT module 200 in the manner described herein, and may communicate with one or more external devices 190 via the wireless transceiver 230. The controller 220 may be provided with information regarding the location and/or desired function of the particular IoT module 200, and may control operation of the IoT module 200 based at least in part on such information. For example, the controller 220 may operate the IoT module 200 differently when the primary region 81 is a hallway than when the primary region 81 is a bedroom or a restroom. The function and/or operation of the IoT module 200 may be further based on the secondary region 82 associated with the IoT module 200. Certain examples of location-dependent functions are described herein.

The wireless transceiver 230 facilitates communication between the controller 220 and at least one external device 190, such as an access control system 192, a smart home system 194, a cloud server 196, a mobile device 198, and/or another IoT module 200'. As will be appreciated, the controller 220 may communicate with one or more of the external devices 190 via another of the external devices 190. By way of example, the controller 220 may communicate with a gateway via the wireless transceiver 230, and with the smart home system 194 via the gateway. As another example, the wireless transceiver 220 may facilitate wireless communication with the wireless transceiver 220 of another IoT module 200', for example to form a mesh network or a pseudo-mesh network through which each IoT module is capable of communicating with the access control system 192. The wireless transceiver 230 may, for example, include one or more of a Bluetooth transceiver 221 such as a Bluetooth Low Energy (BLE) transceiver, a ZigBee transceiver 222, a Z-Wave transceiver 223, a Thread transceiver 224, a proprietary transceiver 225, a Wi-Fi transceiver 226, and/or a cellular transceiver 227.

The power source 240 includes at least one of an energy storage device 242 or a connection to line power 244. In the illustrated form, the power source 240 includes an energy storage device 242 in the form of a battery operable to be mounted in the battery compartment 218. For example, the battery may be provided in the form of a replaceable coin cell battery. As another example, the energy storage device 242 may be provided in the form of a rechargeable battery or a supercapacitor, and the power source 240 may include an energy harvester 245 operable to charge the energy storage device 242. Such an energy harvester 245 may, for example, take the form of an inductive power receiver 246 operable to receive power from an inductive power generator 247, or the form of a photocell 248 operable to harvest energy when exposed to electromagnetic radiation (e.g., sunlight and/or artificial light). As should be appreciated, the power source 240 may further comprise regulation circuitry configured to place the power provided by the power source 240 in a form usable by the controller 220 and/or other electronic components of the IoT module 200.

The light ring 250 is mounted behind the translucent shroud 214 such that the light ring 250 is operable to illuminate the shroud 214, thereby providing light to the region proximate the IoT module 200. The light ring 250 includes an array of light-emitting diodes (LEDs) 252 and a driver 254 operable to control operation of the LED array 252 based on commands received from the controller 220. In the illustrated form, the LED array 252 is provided in the form of a red-green-blue (RGB) LED array such that the LED array 252 is operable to illuminate the shroud 214 with various colors and/or patterns. In certain forms, the light ring 250 may be considered to include the shroud 214. As described herein, operation of the light ring 250 may be controlled by the controller 242 based upon information received from the sensor array and/or information received from the external device 190. For example, the controller 242 may activate the light ring 250 in response to detecting movement via the movement sensor 270 and/or in response to receiving a command from the external device 190.

The audio device 260 may include a microphone 262 and/or a speaker 264. In certain embodiments, the microphone 262 and/or the speaker 264 may facilitate communication between a user and the smart home system 194. For example, the smart home system 194 may have a virtual assistant that facilitates a natural language interface between the user and the smart home system 194, and the microphone 262 and speaker 264 may be utilized to relay spoken commands and audible feedback between the user and the smart home system 194. In certain forms, the controller 220 itself may be operable to facilitate natural language interface with the user.

The movement sensor 270 is configured to detect at least one type of movement at or in the vicinity of the IoT module 200. For example, the movement sensor 270 may be configured to detect movement in the vicinity of the IoT module 200, movement of a user interfacing with the IoT module 200, or movement of the IoT module 200 itself. The controller 220 may relay information generated by the movement sensor 270 to the external device 190 and/or make certain decisions based on information generated by the movement sensor 270. For example, the controller 242 may control operation of the light ring 250 based at least in part upon detecting movement via the movement sensor 270.

In certain forms, the movement sensor 270 may be configured to detect movement within a room bordering the door 80 on which the IoT module 200 is mounted, such as the primary region 81. For example, the illustrated IoT module 200 includes a passive infrared (PIR) sensor 271 mounted behind the window 216, which may be passive to infrared (IR) radiation to facilitate operation of the PIR sensor 271. Additionally or alternatively, the movement sensor 270 may be provided in the form of a camera 272, which may likewise be mounted behind the window 216. Such movement sensors may also serve as occupancy sensors to detect occupancy of the primary region 81 when the door 80 is closed.

In certain forms, the movement sensor 270 may be configured to detect movement of a user interfacing with the IoT module 200. For example, the movement sensor 270 may include a capacitive sensor 273 operable to detect taps and/or swipes of a user's finger on and/or along the shroud 216.

In certain forms, the movement sensor 270 may be configured to detect movement of the door 80 by detecting movement of the IoT module 200 itself. For example, the movement sensor 270 may comprise an accelerometer 274 or a gyrometer 276 configured to generate information relating to movement of the IoT module 200. As another example, the movement sensor 270 may comprise a magnetometer 275 that detects movement of the door 80 based on changes in a reference magnetic field. By way of illustration, a magnet may be mounted in the strike into which the latchbolt 122 extends when the door 80 is in the closed position, and the magnetometer 275 may determine movement of the door 80 based on changes in the sensed magnetic field. The magnetometer 275 may additionally or alternatively serve as a door position sensor that detects the open/closed position of the door 80 based on characteristics of the magnetic field.

The environmental sensor 280 is configured to detect at least one condition relating to the environment in the vicinity of the IoT module 200. By way of example, the environmental sensor 280 may include one or more of an ambient light sensor 281, a thermometer 282, a humidity sensor 283, and/or a barometer 284. In certain embodiments, the environmental sensor 280 may be configured to detect the presence of a hazardous condition. For example, the environmental sensor 280 may include a carbon monoxide detector 285 and/or a smoke detector 286. The controller 220 may relay information generated by the environmental sensor 280 to the external device 190 and/or make certain decisions based on information generated by the environmental sensor 280.

The additional feedback mechanism 290 may, for example, include a display 292 and/or a haptic feedback mechanism 294. By way of example, the display 292 may be provided as an e-ink display, and may facilitate operation of the IoT module 200 by displaying various options, menus, and/or operating parameters. The haptic feedback mechanism 294 may be operable to vibrate the IoT module 200 (and therefore the lockset 100), for example to provide tactile feedback and/or to facilitate operation of the lockset 100 by the visually impaired. For example, during emergency conditions, the haptic feedback mechanism 294 may vibrate when the PIR sensor 271 detects a user approaching to indicate to the user the presence of an emergency condition (e.g., fire or hazardous weather).

As noted above, the IoT module 200 is structured to transmit to an external device 190 information received from a sensor array including at least one sensor, such as a microphone 262, one or more movement sensors 270 and/or one or more environmental sensors 280. In certain forms, the IoT module 200 may transmit the information periodically, such as once per predetermined unit of time. In certain embodiments, the IoT module 200 may additionally or alternatively transmit information and/or alerts based on information received from the sensor array. For example, one or more sensors may have associated therewith a time-critical criterion, and the IoT module 200 may push to the external device 190 a notification or alert when a time-critical criterion is satisfied. As one example, a time-critical criterion may involve detection of a hazardous condition via the carbon monoxide detector 285 and/or the smoke detector 286, and the IoT module 200 may push to the external device 190 an alert when the hazardous condition is detected. As another example, the IoT module may push to the external device 190 a notification when the PIR sensor 271 detects movement in the vicinity of the IoT module 200.

While the illustrated IoT module 200 is provided as a retrofit for an existing lockset 100, it is also contemplated that one or more features of the module 200 may be incorporated into the lockset 100 itself. For example, the base 212 of the housing assembly 210 may be integrated with the spring cage 112 of the handleset 110 such that the handleset 110 and the IoT module 200 form a single unit at the time of sale to an end-user. Thus, it should be appreciated that the features and functions described in association with the IoT module 200 may alternatively be accomplished by a lockset 100 incorporating the corresponding features and functions described in association with the IoT module 200.

Provided hereinafter are certain example use-case scenarios that may be performed using the lockset 100 and/or a network of plural locksets 100. As will be appreciated, each lockset 100 may include the IoT module 200 or may have certain features of the illustrated IoT module 200 integrated therewith. It should further be appreciated that the operations described in association with example use-case scenarios may be performed wholly or in part by the IoT module 200 and/or the external device 190, and that the operations may be distributed among one or more IoT modules 200 and/or one or more external devices 190.

In one example use-case scenario, the light ring 250 may be utilized to provide a convenience light function. For example, when the ambient light sensor 281 indicates that the space in the vicinity of the lockset 100 is dark and the PIR sensor 271 detects movement in the vicinity of the lockset 100, the light ring 250 may illuminate to aid the user's navigation through the dark area. In certain embodiments, the IoT modules 200 of plural locksets 100 may be linked to provide simultaneous illumination. For example, when several IoT modules are installed to doors facing the same hallway, illumination of the light ring 250 of one IoT module 200 may cause a corresponding illumination of the light rings 250 of the other IoT modules 200 for which the primary region 82 is the hallway. Such contemporaneous illumination may be achieved by causing the IoT modules 200 to communicate with one another via the wireless transceiver 230.

Another example use-case scenario involving the light ring 250 pertains to a nightlight function. By way of example, the IoT module 200 may be programmed to display various color themes and patterns via the light ring 250 to comfort children attempting to sleep. The nightlight function may involve an automatic shutoff that terminates the function after a predetermined period of time. The nightlight function may reactivate when movement of the child is detected via the PIR sensor 271, or when crying is detected via the microphone 262. An IoT module 200 installed to a child's room may additionally or alternatively be programmed to provide a certain degree of entertainment for the child. For example, the controller 220 may cause the speaker 264 to make an engine sound when the handle 114 is rotated.

Another example use-case scenario involving the light ring 250 pertains to an occupancy function. For example, a lockset 100 mounted to a restroom door may include an inner IoT module 200 that faces the restroom and an outer IoT module 200' that faces the adjacent region when the door 80 is closed. When the inner IoT module 200 determines that the restroom is occupied (e.g., via the PIR sensor 271), the light ring 250 of the outer IoT module 200' indicates to approaching users that the restroom is occupied, for example by generating a red ring. When the inner IoT module 200 determines that the restroom is unoccupied, the outer IoT module 200' may indicate that the restroom is available, for example by generating a green ring.

The intensity of the light emitted by the light ring 250 may be modulated based in part on information received from the ambient light sensor 281. For example, the light ring 250 may be illuminated to a greater intensity when the ambient light sensor 281 indicates that the adjacent region is already illuminated (e.g., by sunlight and/or artificial light), and may be illuminated to a lesser intensity when the ambient light sensor 281 indicates that the adjacent region is relatively dark.

In certain situations, the IoT module 200 may be utilized to monitor occupancy of a room, which may be utilized by the smart home system 194 to any number of ends. Occupancy of the room may, for example, be determined using the PIR sensor 271 and/or the microphone 262. In certain forms, the smart home system 194 may adjust the lighting in a room based on occupancy, for example by turning the lights out when the room is unoccupied. As another example, the smart home system 194 may adjust operation of a heating, ventilation, and air conditioning (HVAC) system based on occupancy. By way of illustration, if it is determined that a room is not currently occupied, the smart home system 194 may expand the range of permissible temperatures for that room, thereby causing the HVAC system to heat or cool the room with a lower duty cycle, thereby reducing energy usage.

The IoT module 200 may additionally or alternatively be utilized to monitor activity within a particular region. For example, parents of young children may wish to be alerted when there is movement in the child's room, which may indicate that the child is out of bed during sleeping hours. As another example, a caregiver for an elderly or infirm patient may wish to know that the patient is active during their normal hours, which would indicate that the patient has not fallen or become bedridden. In cases such as these, the parents or the caregiver may be able to access the smart home system 194 via an app 199 on a mobile device 198 to monitor one or more of the movement sensors 270. In certain embodiments, the user may remotely cause the IoT module 200 to perform one or more actions based upon the information received via the app 199. For example, upon detecting movement in the child's room, a parent may remotely cause the light ring 250 to activate the above-described nightlight function.

The IoT module 200 may further find use outside the single-family home environment, such as in apartment complexes, educational institutions, and/or commercial facilities. For example, the IoT module 200 may be linked to the access control system 192 of such installations, and may aid in providing alarms and alerts throughout the facility. As one example, the light rings 250 may aid in illuminating hallways during power outages, or may be used to indicate a path to safety. By way of illustration, during an emergency condition, the access control system 192 may cause the light rings 250 to illuminate green on those doors that are along the preferred escape route, and cause the light rings 250 to illuminate red on those doors that are not along the preferred fire escape path. Thus, a person traveling from one green light to the next will eventually find themselves in a place of relative safety (e.g., outside in the event of a fire emergency or in a storm shelter in the event of a weather emergency). The light rings 250 may additionally or alternatively be used to indicate the presence of an emergency condition, such as by repeatedly flashing in a strobe pattern. Alarms for different emergency conditions may be provided with different color themes and patterns to enable users familiar with the patterns to quickly distinguish between a fire situation and a hazardous weather situation. The propagation of information relating to emergency conditions may additionally or alternatively be facilitated by the speaker 264. For example, the access control system 192 may transmit audible instructions to the user via the IoT module 200.

In certain forms, the controller 220 may be programmed to recognize certain verbal commands received via the microphone 262. For example, the IoT module 200 of an elderly person may be programmed to recognize the phrase “Help, I've fallen”, and may alert a caregiver or emergency personnel in response to detecting the utterance of the phrase, for example by providing a push notification to an external device 190. Additionally or alternatively, the microphone 262 may not necessarily be used to detect speech, and may instead be utilized to detect aberrant noises, such as the breaking of glass. Such aberrant noises may be deemed time-critical events, and may result in the IoT module pushing a notification or an alert to the external device 190.

The IoT module 200 and/or a lockset 100 including features corresponding to those described with reference to the IoT module 200 may provide for one or more advantages over existing devices. As one example, the IoT module 200 may provide for increased safety in day-to-day and/or emergency conditions. For example, the IoT module 200 may be used to monitor a child or elderly person as described above. Additionally or alternatively, the IoT module 200 may be utilized to guide persons to zones of safety during emergency situations as described above.

Other advantages that may be associated with the IoT module 200 pertain to the use of the IoT module 200 in connection with a lockset such as the lockset 100. For example, the functions provided by the IoT module 200 are provided in a location that is known to be accessible to the user (i.e., in an accessible location on the door 80), thereby facilitating both input to the IoT module 200 and the recognition of output from the IoT module 200. As another example, the IoT module 200 can be provided at a single location in the room that does not interfere with use of the room. By contrast, certain existing IoT devices require that the device occupy space on a table or cabinet, or be plugged into an electrical outlet. Thus, the IoT module 200 provides for discreet sensing of various parameters (e.g., occupancy, temperature, ambient light) without detracting from the overall aesthetic and use of the room.

A further advantage that may be associated with the IoT module 200 pertains to its use in connection with a smart home system 194. By providing for combined occupancy and temperature detection, the IoT module 200 may facilitate control of the home's HVAC system to reduce energy usage. Similar advantages may be provided in non-residential environments, such as commercial installations.

Figure 5:
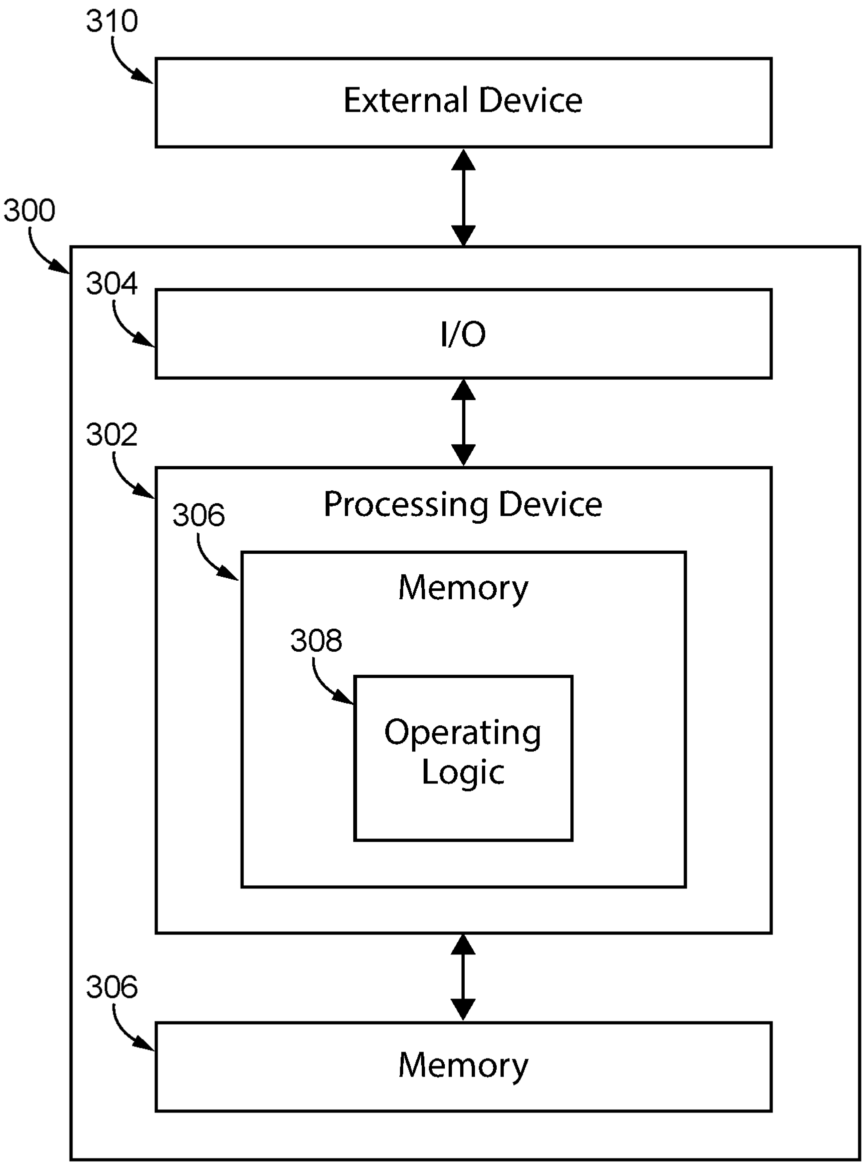
FIG. 5 is a schematic block diagram of a computing device.

Referring now to FIG. 5, a simplified block diagram of at least one embodiment of a computing device 300 is shown. The illustrative computing device 300 depicts at least one embodiment of an IoT module or controller that may be utilized in connection with the IoT module 200 or controller 220 illustrated in FIG. 3.

Depending on the particular embodiment, the computing device 300 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the IoT module 200, the controller 220, the wireless transceiver 230, the light ring 250, the audio device 260, the movement sensor 270, the environmental sensor 280, the additional feedback device 290, and/or the external device 190 (e.g., the access control system 192, the smart home system 194, the cloud server 196, the mobile device 198, and/or the external IoT module 200'). Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As illustrated, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 5, it should be appreciated that a particular computing device 300 may include multiple processing devices 302, I/O devices 304, and/or memories 306 in other embodiments. Further, in some embodiments, more than one external device 310 may be in communication with the computing device 300.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

a control device in wireless communication with a plurality of controlled electronic devices, wherein the control device is operable to control at least one function of each controlled electronic device;

a lockset, wherein the lockset comprises a first of the controlled electronic devices, the lockset comprising:

a latch mechanism operable to be installed to a door;

a housing assembly comprising a base and a translucent shroud mounted to the base;

a handle mounted for rotation relative to the housing assembly and operable to actuate the latch mechanism;

a light source mounted to the housing assembly and operable to illuminate the translucent shroud;

a controller mounted to the housing assembly and in communication with the light source;

a sensor array mounted to the housing assembly, the sensor array comprising a presence sensor operable to detect presence of a user in a vicinity of the lockset; and a wireless communication device configured to facilitate communication between the lockset and the control device;

wherein the controller is configured to control operation of the light source based at least in part upon information generated by the presence sensor; and wherein the controller is further configured to activate the light source based on information received from the control device; and an additional controlled electronic device of the plurality of controlled electronic devices; and wherein the control device is configured to cause the additional controlled electronic device to perform a selected action based on information generated by the sensor array.

2. The system of claim 1, the lockset further comprising:

a handleset including a spring cage and the handle, and wherein the handle is rotatably mounted to the spring cage; and an add-on module separable from the handleset as a modular unit, and wherein the add-on module comprises the housing assembly, the light source, the controller, and the presence sensor.

3. The lockset system of claim 1, wherein the additional controlled electronic device comprises another of the lockset; and wherein the controller of the lockset is configured to activate the light source of the lockset based upon information received from the other of the lockset via the control device.

4. A system, comprising:

a lockset in wireless communication with a smart home control system, the lockset comprising:

a housing assembly comprising a base and a shroud mounted to the base;

a handle mounted to the housing assembly for rotation about a rotational axis;

a light source mounted within the housing assembly and operable to illuminate the shroud;

a sensor array comprising:

an accelerometer operable to detect movement of the lockset apparatus; and a presence sensor configured to detect presence of a user in a vicinity of the lockset apparatus;

a controller operable to selectively activate the light source to thereby illuminate the shroud; and a wireless communication device configured to facilitate the wireless communication between the controller and the smart home control system;

wherein the controller is configured to cause the light source to illuminate the shroud in response to detection of the user;

wherein the controller is further configured to cause the light source to illuminate the shroud based on information generated by the accelerometer; and wherein the controller is further configured to cause the light source to illuminate the shroud under control of the smart home control system; and an additional electronic device in wireless communication with the smart home control system and configured to perform an additional action under control of the smart home control system based on information generated by the sensor array.

5. The system of claim 1, wherein a visible portion of the translucent shroud fully circumferentially surrounds a rotational axis of the handle.

6. The system of claim 1, wherein the lockset is configured to wirelessly transmit to the control device occupancy information based on information generated by the presence sensor; and wherein the additional electronic device is configured to perform one or more actions under control of the control device based on the occupancy information.

7. The system of claim 6, wherein the additional controlled electronic device comprises an additional light source; and wherein the additional controlled electronic device is configured to illuminate the additional light source under control of the control device based on the occupancy information.

8. The system of claim 6, wherein the additional controlled electronic device comprises a heating, ventilation, and air conditioning (HVAC) system; and wherein the HVAC system is configured to adjust an HVAC operation under control of the control device based on the occupancy information.

9. The system of claim 6, wherein the additional controlled electronic device comprises a mobile device; and wherein the mobile device is configured to push a user notification under control of the control device based on the occupancy information.

10. The system of claim 1, wherein the control device is in communication with a plurality of the lockset and/or a plurality of the additional controlled electronic device.

11. A system comprising a plurality of locksets, each lockset comprising:

a housing assembly comprising a base and a shroud mounted to the base;

a handle mounted to the housing assembly and operable to actuate a latch mechanism;

a light source mounted within the housing assembly and operable to illuminate a shroud;

a presence sensor configured to detect presence of a user in a vicinity of the lockset apparatus; and a controller operable to selectively activate the light source to thereby illuminate the shroud, wherein the controller is operable to cause the light source to illuminate the shroud in response to detection of the user; and a wireless communication device through which the controller is in communication with a smart home system; and wherein each lockset is further configured to wirelessly transmit to the smart home system information occupancy information based on information generated by the presence sensor, and to illuminate the light source of the lockset under control of the smart home system based on occupancy information generated by another of the locksets.

12. The system of claim 11, wherein each lockset further comprises a movement sensor configured to detect movement of the lockset; and wherein the controller of each lockset is further configured to activate the light source of the lockset in response to detecting movement of the lockset via the movement sensor of the lockset.

13. The system of claim 11, further comprising an additional device other than a lockset;

wherein the additional device is configured to perform one or more actions under control of the smart home system based on the occupancy information.

14. The system of claim 13, wherein the additional device comprises one of an additional light source, a mobile device, or a heating, ventilation, and air conditioning (HVAC) system.

15. The system of claim 11, wherein each lockset further includes a microphone and is configured to transmit to the smart home system command information based on commands spoken by a user to the lockset.

16. The system of claim 11, further comprising the smart home system, wherein the smart home system is configured to receive the occupancy information from the other of the locksets and to command illumination of the light source based on the occupancy information.

17. The system of claim 11, further comprising the smart home system, wherein the smart home system is operable to control the light source of each of the locksets based on information generated by the sensor array of another of the locksets.

18. The system of claim 4, further comprising the smart home control system.

19. The system of claim 18, wherein the additional electronic device comprises a second of the lockset; and wherein the smart home control system is configured to cause the light source of the lockset to illuminate the shroud of the lockset based on information generated by the sensor array of the second of the lockset.

20. The system of claim 18, wherein the additional electronic device comprises a mobile device; and wherein the smart home control system facilitates wireless communication between the mobile device and the lockset.

21. The system of claim 20, wherein the smart home control system is operable to cause the controller to control the light source based on information received from the mobile device.

22. The system of claim 4, wherein the controller is configured to transmit to the smart home control system a push notification in response to determining that information generated by the sensor array is indicative of a time-critical criterion.

23. The system of claim 22, wherein the additional electronic device is operable to receive the push notification from the smart home control system.

* * * * *